US012681704B2

(12) United States Patent
Kunz

(10) Patent No.: US 12,681,704 B2
(45) Date of Patent: Jul. 14, 2026

(54) ITERATIVE GENERATION OF INTERMEDIATE REPRESENTATIONS WITH LARGE LANGUAGE MODELS

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 18/623,784

(22) Filed: Apr. 1, 2024

(65) Prior Publication Data

US 2025/0306874 A1 Oct. 2, 2025

(51) Int. Cl.
*G06F 8/41* (2018.01)

(52) U.S. Cl.
CPC ..................................... *G06F 8/42* (2013.01)

(58) Field of Classification Search
CPC ..... G06F 8/30; G06F 8/35; G06F 8/42; G06F 8/43; G06F 8/51; G06N 3/045; G06N 3/0475

See application file for complete search history.

(56) References Cited

U.S. PATENT DOCUMENTS

| 11,269,602 | B2 * | 3/2022 | Escoffier | ................. | G06F 8/427 |
| 11,308,179 | B2 * | 4/2022 | Kunz | .................... | G06F 16/972 |
| 11,614,925 | B1 * | 3/2023 | Kunz | ........................ | G06F 8/20 |
| | | | | | 717/104 |
| 11,816,474 | B1 * | 11/2023 | Zafar | ........................ | G06F 8/65 |
| 2025/0045531 | A1 * | 2/2025 | Hayes | .................... | G06N 3/047 |
| 2025/0238638 | A1 * | 7/2025 | Ouyang | .................. | G06F 40/51 |

OTHER PUBLICATIONS

"European Application Serial No. 25165051.1, Extended European Search Report mailed Aug. 25, 25", 8 pgs.
Das, Debrup, "MATHSENSEI: A Tool-Augmented Large Language Model for Mathematical Reasoning", arxiv.org, Cornell University Library, 201 Olin Library Cornell University Ithaca, NY 14853, (Mar. 19, 2024), 15 pgs.

* cited by examiner

*Primary Examiner* — Marina Lee
(74) *Attorney, Agent, or Firm* — SCHWEGMAN LUNDBERG & WOESSNER, P.A.

(57) ABSTRACT

In an example embodiment, a framework is provided to allow an LLM to regenerate an intermediate representation based on natural language feedback that is provided on the compilable computer code that was generated using the programmatic component from an earlier intermediate representation. The user is able to provide this feedback without having any knowledge of the intermediate representation and the framework is designed to allow the LLM to incorporate this feedback into future generation requests without the LLM being aware of the compilable computer code that was created from its prior iterations.

20 Claims, 4 Drawing Sheets

200

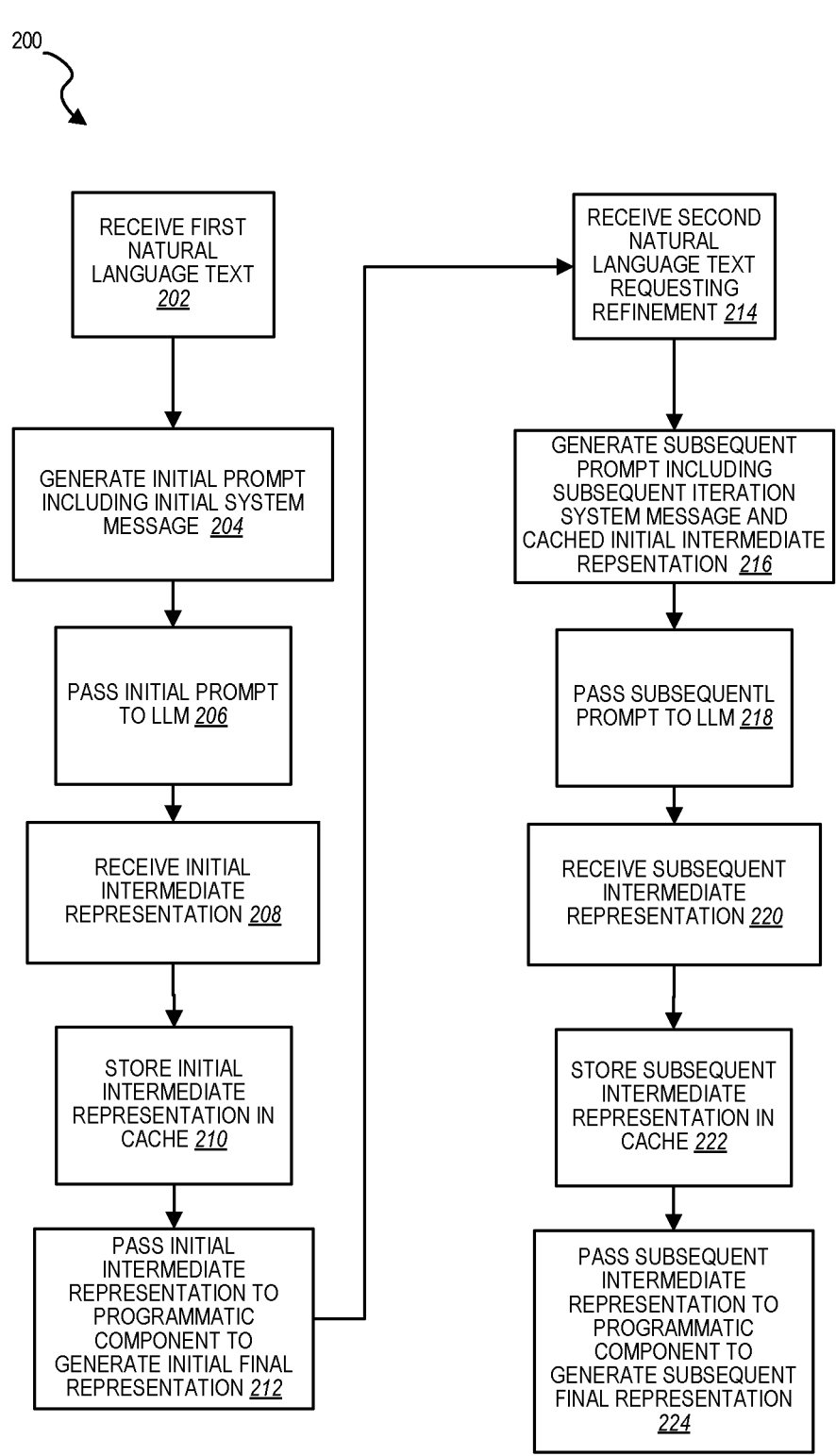

RECEIVE FIRST NATURAL LANGUAGE TEXT _202_

GENERATE INITIAL PROMPT INCLUDING INITIAL SYSTEM MESSAGE _204_

PASS INITIAL PROMPT TO LLM _206_

RECEIVE INITIAL INTERMEDIATE REPRESENTATION _208_

STORE INITIAL INTERMEDIATE REPRESENTATION IN CACHE _210_

PASS INITIAL INTERMEDIATE REPRESENTATION TO PROGRAMMATIC COMPONENT TO GENERATE INITIAL FINAL REPRESENTATION _212_

RECEIVE SECOND NATURAL LANGUAGE TEXT REQUESTING REFINEMENT _214_

GENERATE SUBSEQUENT PROMPT INCLUDING SUBSEQUENT ITERATION SYSTEM MESSAGE AND CACHED INITIAL INTERMEDIATE REPSENTATION _216_

PASS SUBSEQUENTL PROMPT TO LLM _218_

RECEIVE SUBSEQUENT INTERMEDIATE REPRESENTATION _220_

STORE SUBSEQUENT INTERMEDIATE REPRESENTATION IN CACHE _222_

PASS SUBSEQUENT INTERMEDIATE REPRESENTATION TO PROGRAMMATIC COMPONENT TO GENERATE SUBSEQUENT FINAL REPRESENTATION _224_

*FIG. 2*

ITERATIVE GENERATION OF INTERMEDIATE REPRESENTATIONS WITH LARGE LANGUAGE MODELS

TECHNICAL FIELD

This document generally relates to computer systems. More specifically, this document relates to use of large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

FIG. 2 is a flow diagram illustrating a method for automatically generating and refining a CDS model object from natural language text, in accordance with an example embodiment.

DETAILED DESCRIPTION

Figure 1:
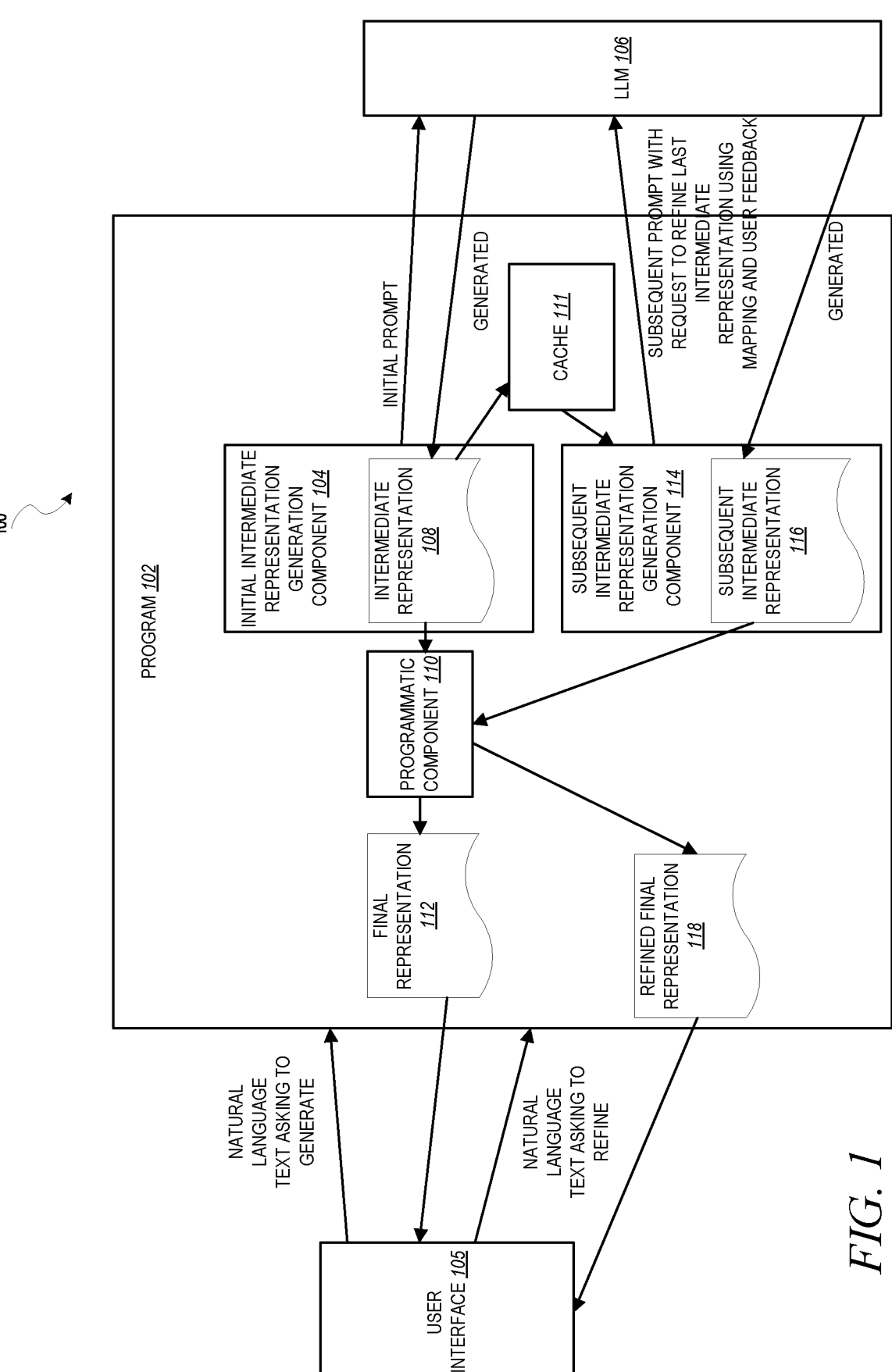
FIG. 1 is a block diagram illustrating a system for automatically generating and refining a CDS model object from natural language text, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

LLMs are highly capable of generating text and even computer code (to be compiled into running software). LLMs, however, are limited due to the fact that their existing knowledge is limited by their training data. The result is that the output is not always correct. There are ways to reduce the impact of this limitation, such as by crafting appropriate system messages, adding external data through generated function invocations, or fine-tuning the foundation models, but these solutions are not perfect and still result in erroneous output. These limitations are amplified when the LLM is outputting computer code that can be compiled (compilable computer code), where it is not only important that the substance of the output be correct but also that the syntax and formatting be correct.

Indeed, certain types of compilable computer code may be even more difficult for an LLM to generate correctly, due to a number of factors, such as the compilable computer code type being one that is proprietary or at least partially proprietary (and thus in a format that is difficult to train an LLM on), and the compilable computer code type being one that is difficult to change once it is generated.

One solution would be to use an LLM to generate an intermediate representation rather than use an LLM to directly generate the desired computer code. In such a solution, the LLM is used to generate the portion of the computer code that cannot be computed programmatically (which may be called the "creative" part for purposes of the present disclosure). The intermediate representation can then be fed into a separate programmatic component that compiles the intermediate representation into compilable computer code. This compiling may involve, for example, sanitizing the intermediate representation, enhancing the intermediate representation, and formatting the intermediate file, as well as modifying the intermediate representation based on a feature set.

The programmatic component does not learn from data and is not influenced by machine learning techniques. Typically, a programmatic component consists of algorithms designed and coded manually by humans, relying on human expertise and knowledge to solve specific problems.

In contrast, the LLM is designed to learn patterns and relationships from data, allowing them to improve their performance over time. LLMs differ from programmatic components in that they can adapt and optimize based on the data they are exposed to.

A technical problem with such a solution, however, is that the LLM lacks awareness of the computer code generated by the programmatic component. This prevents end-users from using the LLM to refine the generated computer code. Such refinements can be critical because the first attempt often does not meet the user's requirements, and merely resubmitting the request as if it were a new request can result in simply repeating either the same erroneous or undesirable output as in the prior iteration, or even new output that is erroneous or undesirable in similar ways as before.

In an example embodiment, a framework is provided to allow the LLM to regenerate an intermediate representation based on natural language feedback that is provided on the compilable computer code that was generated using the programmatic component from the intermediate representation. The user is able to provide this feedback without having any knowledge of the intermediate representation and the framework is designed to allow the LLM to incorporate this feedback into future generation requests without the LLM being aware of the compilable computer code that was created from its prior iterations.

More specifically, a cache is introduced to persist intermediate representations generated by the LLM. While there is no specific limit needed on the size of the cache or how much time these intermediate representations are persisted in the cache, it may be assumed that the cache is at least large enough to persist the intermediate representation generated for a user in the last iteration.

Additionally, a system prompt used to cause the LLM to generate the intermediate representation may be modified to include a mapping between fields of an intermediate representation format and a compilable computer code format.

Furthermore, a different system prompt may be created for use on subsequent iterations versus the first iteration. The system prompt for subsequent iterations may include instructions for the LLM to generate the intermediate representation based on the intermediate generated in the last iteration (from the cache) and the mapping, as well as based on natural language feedback from the user as to how to refine the compilable computer code that was generated from the intermediate representation generated by the LLM in the last iteration.

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. An example cloud platform includes SAP Cloud Application Platform (CAP), from SAP SE of Walldorf, Germany. A cloud platform may run a data model infrastructure, where data models can be created and run.

One example of such a data model infrastructure is Core Data Services (CDS) from SAP SE of Walldorf, Germany. CDS enables service definitions and data models to be declaratively captured in plain object notations. CDS models are typically written in CDS language and then compiled. In an example embodiment, the aforementioned techniques are used to generate a CDS model (which is compliable computer code) by first using an LLM to generate an intermediate representation, such as a JavaScript Object Notation (JSON) file or a Extensible Markup Language (XML) file, and then passing the intermediate representation through a programmatic component to generate the final CDS computer code.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modeling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model will be described.

FIG. 1 is a block diagram illustrating a system 100 for automatically generating and refining a CDS model object from natural language text, in accordance with an example embodiment. Here, a program 102 contains an Intermediate representation generation component 104 that receives natural language text from a user via a user interface 105. The Intermediate representation generation component 104 appends a system message to the natural language text and sends it as a prompt to a LLM 106. The system message will be described in more detail below, but generally instructs the LLM to generate the creative portions of the desired CDS computer code (the portions that will not or cannot be generated programmatically), and the system message includes a mapping between one or more fields of the intermediate representation and one or more fields of the desired CDS computer code. In an example embodiment, the system message instructs the LLM 106 to generate an intermediate representation 108 in a particular protocol, such as JSON. Upon receipt of this intermediate representation 108, the intermediate representation 108 is stored in a cache 111 and then the programmatic component 110 performs one or more programmatic functions on the intermediate representation 108 and converts it to a final representation 112, which is compilable computer code (here being a CDS model).

In an example embodiment, the programmatic component 110 is designed to allow for minimal degrees of freedom in the intermediate representation 108. Degrees of freedom in this context means the number of independent ways the LLM 106 can generate the intermediate representation 108 without impeding any of the constraints placed upon it. Degrees of freedom can also be thought of as the number of independent variables/parameters in a calculation performed by a machine learning model, such as an LLM. Thus, in this case it is desirable for the programmatic component 110 to be created in such a way that it is making as many of the "choices" that the LLM 106 would otherwise make in the code generation process as possible, reducing the number of variables the LLM 106 needs to account for, and ultimately improving the reliability of the final representation 112, since the programmatic component 110 is better in solving deterministic subtasks than creative ones, while the LLM 106 is better at solving creative subtasks than deterministic ones. Thus, during the design of the system 100, a programmer/user/administrator may determine which features need not be used in the LLM portion of the generation process and may design the programmatic component 110 to perform those features.

As an example, the user may supply the following natural language text: "I want to create a bookshop application that lists books and their corresponding authors."

A system message may be added to that natural language text to form a prompt. The prompt may then look as follows:
create a CDS Model for people with names and ages.

You are a domain modeling expert, create a domain model for people following the JSON schema.

```
'''json_schema
{
 "description": "the domain model",
 "type": "object",
 "properties": {
  "namespace": {
   "type": "string"
  },
  "entities": {
   "type": "array",
   "items": {
    "type": "object",
    "properties": {
     "name": {
      "type": "string"
     },
     "elements": {
      "type": "array",
      "items": {
       "type": "object",
       "properties": {
        "name": {
         "type": "string"
        },
        "type": {
         "description": "possible values:
UUID,Boolean,Integer,Decimal(precision,
scale),Double,Date,Time,DateTime,Timestamp,String(length)",
         "type": "string"
        }
       },
       "required": ["name", "type"]
      }
     },
     "associations": {
      "type": "array",
      "items": {
       "type": "object",
       "properties": {
        "name": {
         "type": "string"
        },
        "target": {
         "type": "string"
        },
        "multiplicity": {
         "type": "string"
        },
        "selfContained": {
         "type": "boolean"
        },
        "backlink": {
         "description": "must point to existing association of target",
         "type": "string"
        }
       },
       "required": ["name", "target", "multiplicity", "selfContained"]
      }
     }
    },
    "required": {"name", "elements", "associations"]
   }
  }
 },
 "required": ["namespace", "entities"]
}
'''
Based on this schema, generate the JSON object, do not output any
text, just the JSON, format:
'''json
{{generated JSON}}
'''
```

The LLM may then generate a JSON object based on that prompt.

The JSON object can then be passed to the programmatic component 110 to generate the final representation 112. This final representation 112 may then be passed to the user interface 105 for display to the user. The user may then want to refine the final representation, and thus may submit natural language text with a request to refine the final representation to the user interface. Since this refinement would be an additional iteration of intermediate representation generation, the natural language text asking to refine can be passed to a subsequent intermediate representation generation component 114, along with the previous version of the intermediate representation 108 from the cache 111.

The subsequent intermediate representation generation component 114 can then generate a prompt to the LLM 106 that includes a subsequent iteration version of a system message a copy of the intermediate representation 108 from the cache, the natural language text asking to refine, and the mapping. The LLM 106 then uses this information to produce a refined version of the intermediate representation 108, which may be termed a subsequent intermediate representation 116. The subsequent intermediate representation 116 can then be stored in the cache 111 for use in any further iterations.

Then, the subsequent intermediate representation 116 is sent to the programmatic component 110, which generates the refined final representation 118 in the same manner as it generated the final representation 112. The refined final representation 118 can then be passed to the user interface 105 for display to the user. The user can either accept the refined final representation 118 or make a subsequent natural language text request asking to refine it. If it is the latter, the subsequent intermediate representation generation component 114 is then used to repeat the process in another iteration to generate another refined final representation. This can continue for any number of iterations until the user is satisfied in the result.

As mentioned earlier, an implementation using JSON as the intermediate representation format and CDS as the final representation format is only one example of a combination of intermediate and final representation formats that the above-described techniques can be used for. Unless otherwise indicated, the scope of the claims shall not be limited to JSON and CDS implementations. In example embodiments, the intermediate representation format may be any format that is not compilable but is still descriptive of computer code, while the final representation format may be any format that is compilable computer code.

Additionally, there may be instances where a refinement requested by a user is not possible. To address this, the LLM 106 may be instructed to reply with an explanation of why the refinement was not possible. An example could be if a user requests a change to a value for a variable that is outside of the permissible values for that variable.

As mentioned briefly earlier, the system message for any subsequent iteration may be different than the system message for an initial iteration. For example, the subsequent iteration system message could be:

> You will receive a user description to change the intermediate representation of the final representation. Only change what the user wants. If you cannot change it (because it is not part of the intermediate representation), reply with:
>
> " " markdown
>
> I'm sorry, I cannot help you. <Explanation as to why>
> " "
>
> The intermediate representation should follow the following JSON schema.

```
"'json_schema
{
```

-continued

```
"description": "the domain model",
"type": "object",
"properties": {
  "namespace": {
    "type": "string"
  },
  "entities": {
    "type": "array",
    "items": {
      "type": "object".
      "properties": {
        "name": {
          "type": "string"
        },
        "elements": {
          "type": "array",
          "items": {
            "type": "object",
            "properties": {
              "name": {
                "type": "string"
              },
              "type": {
                "description": "possible values:
UUID,Boolean,Integer,Decimal(precision,
scale),Double,Date,Time,DateTime,Timestamp,String(length)",
                "type": "string"
              }
            },
            "required": ["name", "type"]
          }
        },
        "associations": {
          "type": "array",
          "items": {
            "type": "object",
            "properties": {
              "name": {
                "type": "string"
              },
              "target": {
                "type": "string"
              },
              "multiplicity": {
                "type": "string"
              },
              "selfContained": {
                "type": "boolean"
              },
              "backlink": {
                "description": "must point to existing association of target",
                "type": "string"
              }
            },
            "required": ["name", "target", "multiplicity", "selfContained"]
          }
        }
      },
      "required": ["name", "elements", "associations"]
    }
  }
},
"required": ["namespace", "entities"]
}
"'
```

Based on this schema, generate the JSON object, do not output any text, just the JSON, format:

```
"'json
{{generated JSON}}
"'
```

FIG. 2 is a flow diagram illustrating a method 200 for automatically generating and refining a CDS model object from natural language text, in accordance with an example embodiment. At operation 202, first natural language text describing compilable computer code to be generated is received. In some example embodiments, the first natural language text specifies that the compilable computer code should be in a format that is at least partially proprietary, meaning a format whose schema or format definition is controlled by a single entity. At operation 204, an initial prompt is generated by adding an initial system message to the first natural language text. The initial system message includes an instruction to generate code in an intermediate representation format. In some example embodiments, the system message may be tailored to the specific compilable computer code format that is to eventually be generated. Thus, for example, if the natural language text specifies that the compilable computer code should be in CDS format, then a system message corresponding specifically to CDS is retrieved and appended to the natural language text, as opposed to, for example, a system message corresponding specifically to a non-CDS format that might otherwise be used if the natural language text had specified that the compilable computer code should be in that non-CDS format. In some additional embodiments, the initial system message can also include a mapping between fields of a first format (e.g., a first schema) for intermediate representations and fields of a second format (e.g., a second schema) for final representations.

At operation 206, the initial prompt is passed to a large language model (LLM) to generate the initial intermediate representation. At operation 208, the initial intermediate representation is received. At operation 210, the initial intermediate representation is stored in a cache. At operation 212, the initial intermediate representation is passed to a programmatic component, which applies one or more programmatic functions to the initial intermediate representation, to modify the initial intermediate representation and ultimately produce an initial final representation.

At operation 214, second natural language text requesting a refinement to the initial final representation is received. At operation 216, a subsequent prompt is generated by adding a subsequent iteration system message to the second natural language text and the cached initial intermediate representation. The system message includes an instruction to generate code in an intermediate representation format. In some example embodiments, the system message may be tailored to the specific compilable computer code format that is to eventually be generated. Thus, for example, if the natural language text specifies that the compilable computer code should be in CDS format, then a system message corresponding specifically to CDS is retrieved and appended to the natural language text, as opposed to, for example, a system message corresponding specifically to a non-CDS format that might otherwise be used if the natural language text had specified that the compilable computer code should be in that non-CDS format. In some additional embodiments, the subsequent system message can also include the mapping between fields of a first format (e.g., a first schema) for intermediate representations and fields of a second format (e.g., a second schema) for final representations.

At operation 218, the subsequent prompt is passed to a large language model (LLM) to generate the subsequent intermediate representation. At operation 220, the subsequent intermediate representation is received. At operation 222, the subsequent intermediate representation is stored in a cache. At operation 224, the subsequent intermediate representation is passed to a programmatic component, which applies one or more programmatic functions to the subsequent intermediate representation, to modify the subsequent intermediate representation and ultimately produce a subsequent final representation.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: receiving first natural language text describing compilable computer code to be generated; generating an initial prompt by adding an initial system message to the first natural language text, the system message including an instruction to generate computer code in an intermediate representation; passing the initial prompt to a large language model (LLM); receiving, from the LLM, a generated initial intermediate representation; storing the generated initial intermediate representation in a cache; passing the generated initial intermediate representation to a programmatic component, which validates the generated intermediate representation and converts the generated intermediate representation into an initial final representation, the initial final representation being compilable computer code; receiving second natural language text requesting a refinement to the initial final representation; generating a subsequent prompt by adding a subsequent iteration system message to the second natural language text and the generated initial intermediate representation from the cache; passing the subsequent prompt to the LLM; and receiving, from the LLM, a generated refined initial intermediate representation.

In Example 2, the subject matter of Example 1 comprises, wherein the initial prompt comprises a mapping between fields of a first format for intermediate representations and fields of a second format for final representations, and wherein the generating the subsequent prompt comprises generating the subsequent prompt by adding the subsequent iteration system message to the second natural language text, the generated initial intermediate representation from the cache, and the mapping.

In Example 3, the subject matter of Examples 1-2 comprises, wherein the compilable computer code is in a format that is at least partially proprietary.

In Example 4, the subject matter of Example 3 comprises, wherein the compilable computer code is a Core Data Services (CDS) model.

In Example 5, the subject matter of Examples 1-4 comprises, wherein the intermediate representation is not compilable.

In Example 6, the subject matter of Example 5 comprises, wherein the intermediate representation is a JavaScript Object Notation (JSON) file.

In Example 7, the subject matter of Examples 1-6 comprises, wherein the programmatic component automatically corrects one or more errors in the intermediate representation.

Example 8 is a method comprising: receiving first natural language text describing compilable computer code to be generated; generating an initial prompt by adding an initial system message to the first natural language text, the system message including an instruction to generate computer code in an intermediate representation; passing the initial prompt to a large language model (LLM); receiving, from the LLM, a generated initial intermediate representation; storing the generated initial intermediate representation in a cache; passing the generated initial intermediate representation to a programmatic component, which validates the generated intermediate representation and converts the generated intermediate representation into an initial final representation, the initial final representation being compilable computer code; receiving second natural language text requesting a refinement to the initial final representation; generating a subsequent prompt by adding a subsequent iteration system message to the second natural language text and the generated initial intermediate representation from the cache; passing the subsequent prompt to the LLM; and receiving, from the LLM, a generated refined initial intermediate representation.

In Example 9, the subject matter of Example 8 comprises, wherein the initial prompt comprises a mapping between fields of a first format for intermediate representations and fields of a second format for final representations, and wherein the generating the subsequent prompt comprises generating the subsequent prompt by adding the subsequent iteration system message to the second natural language text, the generated initial intermediate representation from the cache, and the mapping.

In Example 10, the subject matter of Examples 8-9 comprises, wherein the compilable computer code is in a format that is at least partially proprietary.

In Example 11, the subject matter of Example 10 comprises, wherein the compilable computer code is a Core Data Services (CDS) model.

In Example 12, the subject matter of Examples 8-11 comprises, wherein the intermediate representation is not compilable.

In Example 13, the subject matter of Example 12 comprises, wherein the intermediate representation is a Javascript Object Notation (JSON) file.

In Example 14, the subject matter of Examples 8-13 comprises, wherein the programmatic component automatically corrects one or more errors in the intermediate representation.

Example 15 is a non-transitory machine-readable medium storing instructions which, when executed by one or more processors, cause the one or more processors to perform operations comprising: receiving first natural language text describing compilable computer code to be generated; generating an initial prompt by adding an initial system message to the first natural language text, the system message including an instruction to generate computer code in an intermediate representation; passing the initial prompt to a large language model (LLM); receiving, from the LLM, a generated initial intermediate representation; storing the generated initial intermediate representation in a cache; passing the generated initial intermediate representation to a programmatic component, which validates the generated intermediate representation and converts the generated intermediate representation into an initial final representation, the initial final representation being compilable computer code; receiving second natural language text requesting a refinement to the initial final representation; generating a subsequent prompt by adding a subsequent iteration system message to the second natural language text and the generated initial intermediate representation from the cache; passing the subsequent prompt to the LLM; and receiving, from the LLM, a generated refined initial intermediate representation.

In Example 16, the subject matter of Example 15 comprises, wherein the initial prompt comprises a mapping between fields of a first format for intermediate representations and fields of a second format for final representations, and wherein the generating the subsequent prompt comprises generating the subsequent prompt by adding the subsequent iteration system message to the second natural language text, the generated initial intermediate representation from the cache, and the mapping.

In Example 17, the subject matter of Examples 15-16 comprises, wherein the compilable computer code is in a format that is at least partially proprietary.

In Example 18, the subject matter of Example 17 comprises, wherein the compilable computer code is a Core Data Services (CDS) model.

In Example 19, the subject matter of Examples 15-18 comprises, wherein the intermediate representation is not compilable.

In Example 20, the subject matter of Example 19 comprises, wherein the intermediate representation is a JavaScript Object Notation (JSON) file.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
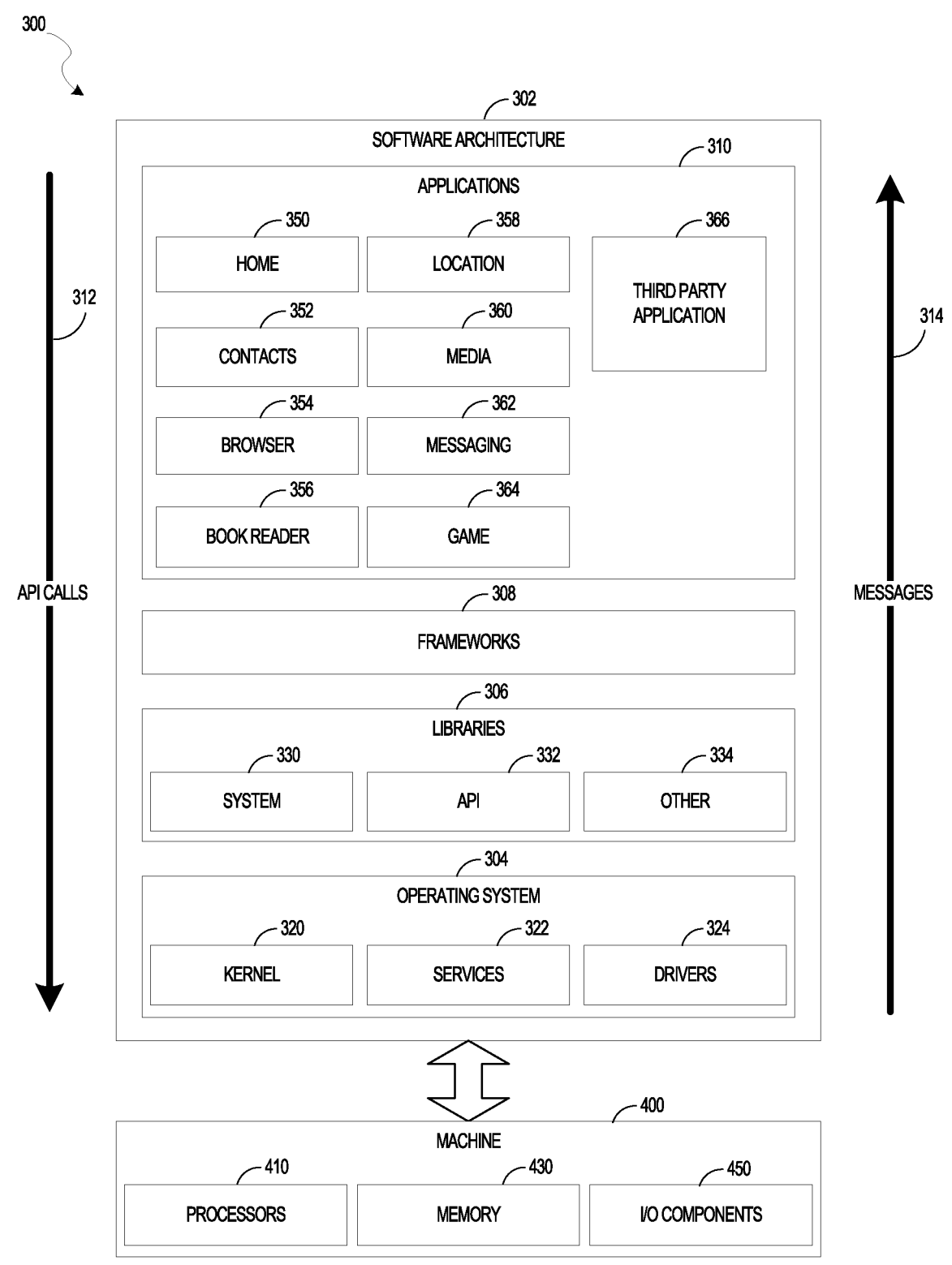
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
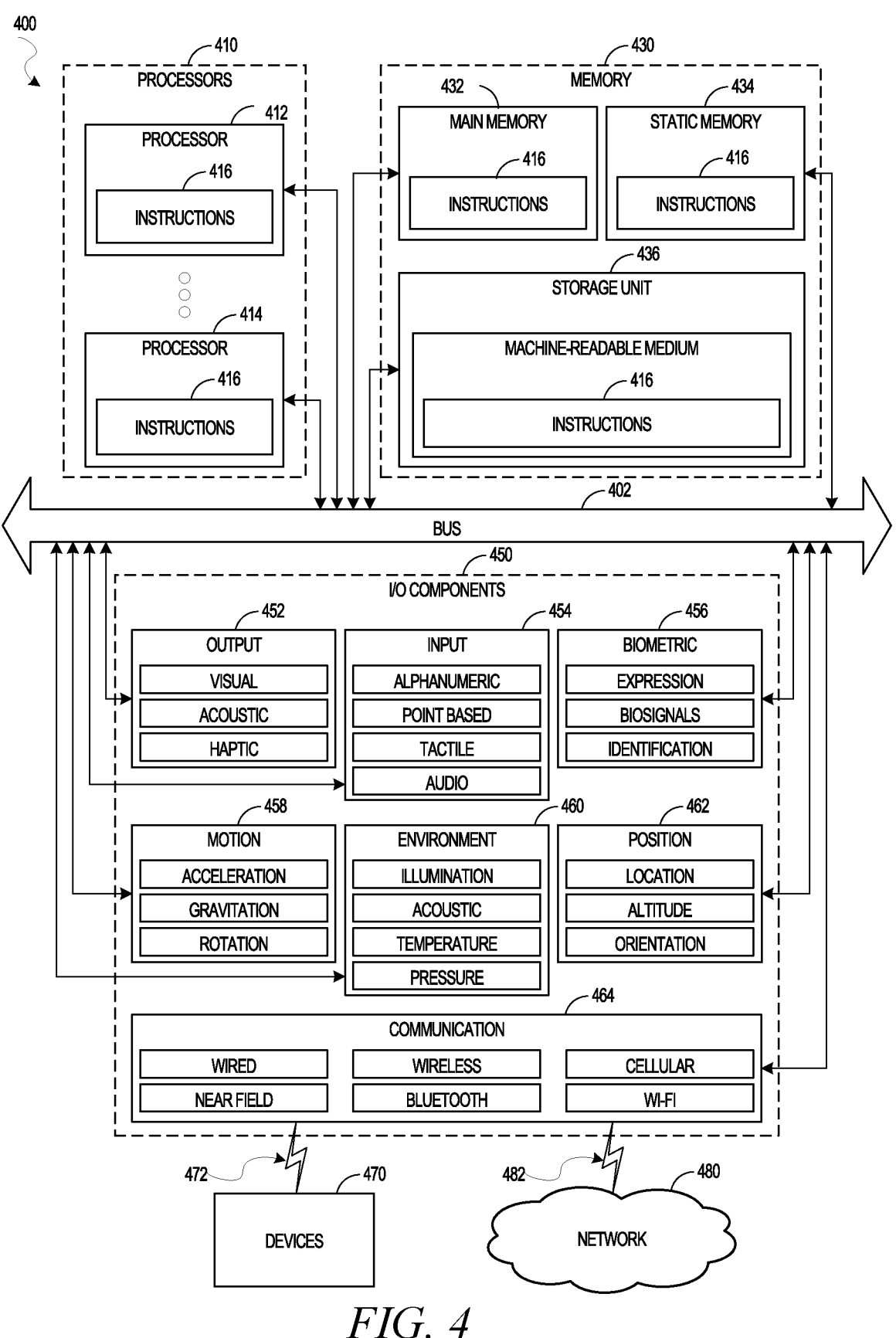
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
receiving first natural language text describing compilable computer code to be generated;
generating an initial prompt by adding an initial system message to the first natural language text, the system message including an instruction to generate computer code in an intermediate representation;
passing the initial prompt to a large language model (LLM);
receiving, from the LLM, a generated first version of an intermediate representation, wherein the intermediate representation is a structured data format that is descriptive of computer code, but is not itself compilable;
storing the generated initial intermediate representation in a cache;
passing the generated initial intermediate representation to a programmatic component, which applies one or more deterministic processes to validate the generated intermediate representation and convert the generated intermediate representation into an initial final representation, the initial final representation being compilable computer code;
receiving second natural language text requesting a refinement to the initial final representation;
generating a subsequent prompt by adding a subsequent iteration system message to the second natural language text and the generated initial intermediate representation from the cache;
passing the subsequent prompt to the LLM; and
receiving, from the LLM, a generated refined initial intermediate representation.

2. The system of claim 1, wherein the initial prompt comprises a mapping between fields of a first format for intermediate representations and fields of a second format for final representations, and wherein the generating the subsequent prompt comprises generating the subsequent prompt by adding the subsequent iteration system message to the second natural language text, the generated initial intermediate representation from the cache, and the mapping.

3. The system of claim 1, wherein the compilable computer code is in a format being at least partially proprietary.

4. The system of claim 3, wherein the compilable computer code is a Core Data Services (CDS) model.

5. The system of claim 1, wherein the intermediate representation is not compilable.

6. The system of claim 5, wherein the intermediate representation is a JavaScript Object Notation (JSON) file.

7. The system of claim 1, wherein the programmatic component automatically corrects one or more errors in the intermediate representation.

8. A method comprising:
receiving first natural language text describing compilable computer code to be generated;
generating an initial prompt by adding an initial system message to the first natural language text, the system message including an instruction to generate computer code in an intermediate representation;
passing the initial prompt to a large language model (LLM);
receiving, from the LLM, a generated first version of an intermediate representation, wherein the intermediate representation is a structured data format that is descriptive of computer code, but is not itself compilable;
storing the generated initial intermediate representation in a cache;
passing the generated initial intermediate representation to a programmatic component, which applies one or more deterministic processes to validate the generated intermediate representation and convert the generated intermediate representation into an initial final representation, the initial final representation being compilable computer code;
receiving second natural language text requesting a refinement to the initial final representation;

generating a subsequent prompt by adding a subsequent iteration system message to the second natural language text and the generated initial intermediate representation from the cache;

passing the subsequent prompt to the LLM; and receiving, from the LLM, a generated refined initial intermediate representation.

9. The method of claim 8, wherein the initial prompt comprises a mapping between fields of a first format for intermediate representations and fields of a second format for final representations, and wherein the generating the subsequent prompt comprises generating the subsequent prompt by adding the subsequent iteration system message to the second natural language text, the generated initial intermediate representation from the cache, and the mapping.

10. The method of claim 8, wherein the compilable computer code is in a format being at least partially proprietary.

11. The method of claim 10, wherein the compilable computer code is a Core Data Services (CDS) model.

12. The method of claim 8, wherein the intermediate representation is not compilable.

13. The method of claim 12, wherein the intermediate representation is a JavaScript Object Notation (JSON) file.

14. The method of claim 8, wherein the programmatic component automatically corrects one or more errors in the intermediate representation.

15. A non-transitory machine-readable medium storing instructions which, when executed by one or more processors, cause the one or more processors to perform operations comprising:

receiving first natural language text describing compilable computer code to be generated;

generating an initial prompt by adding an initial system message to the first natural language text, the system message including an instruction to generate computer code in an intermediate representation;

passing the initial prompt to a large language model (LLM);

receiving, from the LLM, a generated first version of an intermediate representation, wherein the intermediate representation is a structured data format that is descriptive of computer code, but is not itself compilable;

storing the generated initial intermediate representation in a cache;

passing the generated initial intermediate representation to a programmatic component, which applies one or more deterministic processes to validate the generated intermediate representation and convert the generated intermediate representation into an initial final representation, the initial final representation being compilable computer code;

receiving second natural language text requesting a refinement to the initial final representation;

generating a subsequent prompt by adding a subsequent iteration system message to the second natural language text and the generated initial intermediate representation from the cache;

passing the subsequent prompt to the LLM; and receiving, from the LLM, a generated refined initial intermediate representation.

16. The non-transitory machine-readable medium of claim 15, wherein the initial prompt comprises a mapping between fields of a first format for intermediate representations and fields of a second format for final representations, and wherein the generating the subsequent prompt comprises generating the subsequent prompt by adding the subsequent iteration system message to the second natural language text, the generated initial intermediate representation from the cache, and the mapping.

17. The non-transitory machine-readable medium of claim 15, wherein the compilable computer code is in a format being at least partially proprietary.

18. The non-transitory machine-readable medium of claim 17, wherein the compilable computer code is a Core Data Services (CDS) model.

19. The non-transitory machine-readable medium of claim 15, wherein the intermediate representation is not compilable.

20. The non-transitory machine-readable medium of claim 19, wherein the intermediate representation is a JavaScript Object Notation (JSON) file.

* * * * *